United States Patent
Oki et al.

(10) Patent No.: US 8,424,452 B2
(45) Date of Patent: Apr. 23, 2013

(54) DOUGH DIVIDING APPARATUS

(75) Inventors: Yuzuru Oki, Fujisawa (JP); Masami Umetsu, Fujisawa (JP); Takahiro Hasegawa, Fujisawa (JP)

(73) Assignee: Oshikiri Machinery Ltd., Kanagawa (JP)

( * ) Notice: Subject to any disclaimer, the term of this patent is extended or adjusted under 35 U.S.C. 154(b) by 502 days.

(21) Appl. No.: 12/680,815

(22) PCT Filed: Oct. 1, 2007

(86) PCT No.: PCT/JP2007/069192
§ 371 (c)(1),
(2), (4) Date: Mar. 30, 2010

(87) PCT Pub. No.: WO2009/044442
PCT Pub. Date: Apr. 9, 2009

(65) Prior Publication Data
US 2010/0206184 A1    Aug. 19, 2010

(51) Int. Cl.
*A47J 23/00* (2006.01)
*A47J 25/00* (2006.01)

(52) U.S. Cl.
USPC ............................................................. 99/538

(58) Field of Classification Search .............. 99/537, 99/538; 426/231, 503
See application file for complete search history.

(56) References Cited

U.S. PATENT DOCUMENTS

| | | | | |
|---|---|---|---|---|
| 4,268,532 A | * | 5/1981 | Bernard | 426/231 |
| 4,948,611 A | * | 8/1990 | Cummins | 426/503 |
| 5,270,070 A | * | 12/1993 | Campbell | 426/503 |
| 2010/0180779 A1 | * | 7/2010 | Oki et al. | 99/537 |
| 2010/0206184 A1 | * | 8/2010 | Oki et al. | 99/538 |

FOREIGN PATENT DOCUMENTS

| | | |
|---|---|---|
| AU | 638025 | 12/1990 |
| CA | 2 017 788 | 12/1990 |
| EP | 0 404 389 A1 | 12/1990 |
| JP | 49-30959 | 8/1974 |
| JP | 58-4194 | 1/1983 |
| JP | 62-134066 | 6/1987 |
| JP | 3-30625 | 2/1991 |

OTHER PUBLICATIONS

WIPO Translation download,JP2007069192 Dough Divider, http://patentscope.wipo.int/search/, 14 pages.*
International Search Report issued Oct. 23, 2007 in corresponding International Application No. PCT/JP2007/069192.

* cited by examiner

Primary Examiner — Gene Kim
Assistant Examiner — M Chambers
(74) *Attorney, Agent, or Firm* — Wenderoth, Lind & Ponack, L.L.P.

(57) ABSTRACT

A dough dividing apparatus includes a dough discharge member (26) having a front end surface (30) having a recessed surface (28) extending substantially horizontally and having a circular arc-shaped cross-section and dough discharge holes (34) having outlets (32) opening on the front end surface, cutters (38) having cutting edges (36) extending in the longitudinal direction of the recessed surface (28), and a cutter driving device (40) that causes the cutting edges (36) to perform circular motion while keeping the cutters in a fixed posture so that the cutting edges periodically slide along the recessed surface downward from above it to cut and divide dough continuously extruded from the outlets (32).

11 Claims, 4 Drawing Sheets

1

DOUGH DIVIDING APPARATUS

TECHNICAL FIELD

The present invention relates to a dough dividing apparatus for dividing bread dough prepared in a mixer into volumes suitable for baking.

BACKGROUND ART

In the production of bread, bread dough prepared in a mixer is divided into volumes suitable for baking and then subjected to processing such as intermediate fermentation.

An apparatus that performs such a dough dividing process is disclosed in U.S. Pat. No. 4,948,611 (Patent Literature 1). In this apparatus, a manifold that receives dough from a mixer divides it into a plurality of streams of dough and continuously discharges the dough streams from its outlets. The dough discharged from each outlet is divided into pieces by a blade that periodically slides along the outlet end surface downward from above it. Specifically, the blade has a cutting edge that slides along the outlet end surface. When the cutting edge slides along the outlet end surface downward from above it, the blade extends obliquely upward from the cutting edge. When the cutting edge has slid across the outlet end surface, the blade is pivoted to extend substantially vertically so as to separate the cutting edge from the outlet end surface. While being pivoted in this way, the blade is moved upward to prevent it from interfering with the subsequent flow of dough discharged from the outlet.

U.S. Pat. No. 5,270,070 (Patent Literature 2) discloses another dough dividing apparatus. In this apparatus, a blade having a cutting edge slidably engaged with the associated outlet end surface of a manifold is circularly moved along the end surface, thereby causing the cutting edge to move across the outlet in the course of circularly moving downward from above and thus cutting dough.

Patent Literature 1: U.S. Pat. No. 4,948,611
Patent Literature 2: U.S. Pat. No. 5,270,070

SUMMARY OF INVENTION

Technical Problem

The apparatus disclosed in Patent Literature 1 needs to move the blade as stated above. Therefore, the apparatus requires a complicated link mechanism and hence is unsuitable for high-rate cutting.

In the apparatus disclosed in Patent Literature 2, the blade is moved as stated above. Accordingly, the length of time that the blade closes the outlet is long, and therefore, the blade may interfere with the discharge of the subsequent dough from the outlet. It is necessary in order to prevent this problem that the blade is moved in an intermittent fashion to temporarily stop at a position off the outlet, for example. Because the blade cuts the dough when moving downward from above during the circular motion as stated above, the blade motion involves a lateral movement, and a lateral force is applied to the dough being cut. Therefore, dough pieces cut and dropped on the belt conveyor may undesirably move laterally.

An object of the present invention is to provide a dough dividing apparatus free from the above-described disadvantages of the conventional dough dividing apparatus.

Solution to Problem

The present invention provides a dough dividing apparatus including a dough discharge member having a front end surface having an elongated recessed surface extending substantially horizontally and having a circular arc-shaped cross-section, and a dough discharge hole having an outlet opening on the front end surface. The dough dividing apparatus further includes a cutter having a cutting edge extending in the longitudinal direction of the recessed surface, and a cutter driving device that causes the cutting edge to perform circular motion while keeping the cutter in a fixed posture so that the cutting edge periodically slides along the recessed surface downward from above it to cut and divide dough continuously extruded from the outlet.

In this apparatus, the outlet of the dough discharge hole opens on a recessed surface extending substantially horizontally and having a circular arc-shaped cross-section. Therefore, the dough can be cut off by rotationally driving the cutter. Accordingly, the cutter only needs to be rotationally driven, and thus the driving mechanism can be simplified. Further, after cutting off the dough, the cutter moves in a circular path to separate from the front end surface of the dough discharge member. Therefore, even if the rotational movement of the cutter is fairly slow, the cutter can be prevented from interfering with the flow of dough discharged from the dough discharge hole subsequent to the dough that has just been cut off.

The cutter driving device may have a parallel link mechanism that supports the cutter and that causes the cutting edge to perform circular motion.

Specifically, the parallel link mechanism may have a stationary frame provided above the dough discharge member, a first rotating shaft rotatably mounted on the stationary frame in parallel to the longitudinal direction of the recessed surface, a second rotating shaft rotatably mounted on the stationary frame in parallel to the first rotating shaft, mutually parallel first and second links secured to the first and second rotating shafts to rotate together with them, respectively, and a third link provided between the first and second links and rotatably attached to the distal ends of the first and second links. At least one of the first and second rotating shafts is rotated, and the cutter is connected to and moved with the third link to cause the cutting edge to perform circular motion.

That is, because the cutting edge is made to perform circular motion by using a parallel link mechanism, the structure for moving the cutting edge can be simplified as compared to the above-mentioned U.S. Pat. No. 4,948,611, and it is also possible to perform a high-speed operation.

More specifically, the first and second rotating shafts may have first and second belt pulleys, respectively, and may be rotationally driven by a driving belt passing over the first and second belt pulleys.

Further, in this dough dividing apparatus, the outlet may have its lower end located rearward of its upper end. With the outlet configured in this way, the dough can be cut off to drop naturally from the outlet onto a belt conveyor located under the outlet.

More specifically, the dough discharge member may have a plurality of dough discharge holes spaced from each other in the longitudinal direction of the recessed surface.

In this case, the dough dividing apparatus may be arranged as follows. The dough discharge member has a plurality of block-shaped members aligned with each other in the longitudinal direction of the recessed surface. The block-shaped members respectively have surfaces aligned with each other in the longitudinal direction of the recessed surface to constitute the front end surface, and the dough discharge holes open on the respective surfaces of the block-shaped members.

DETAILED DESCRIPTION OF THE INVENTION

An embodiment of the dough dividing apparatus according to the present invention will be explained below with reference to the accompanying drawings.

Figure 1:
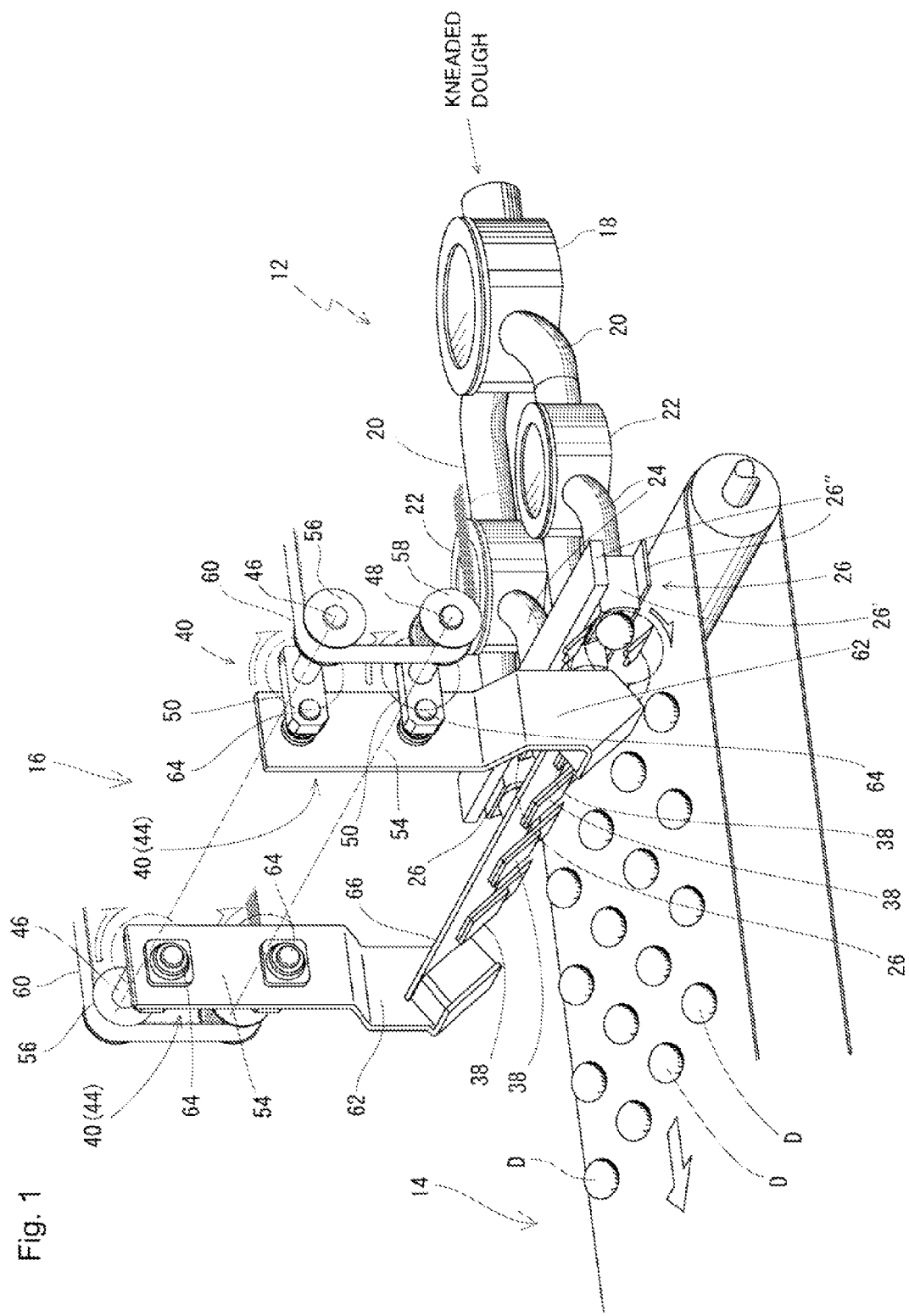
FIG. 1 is a perspective view of a dough dividing apparatus according to the present invention, showing the way in which the apparatus is installed.

FIG. 1 shows a dough dividing apparatus 16 that cuts and divides dough supplied from a dough distributing device 12 into pieces of dough and that supplies the dough pieces onto a belt conveyor 14.

Figure 2:
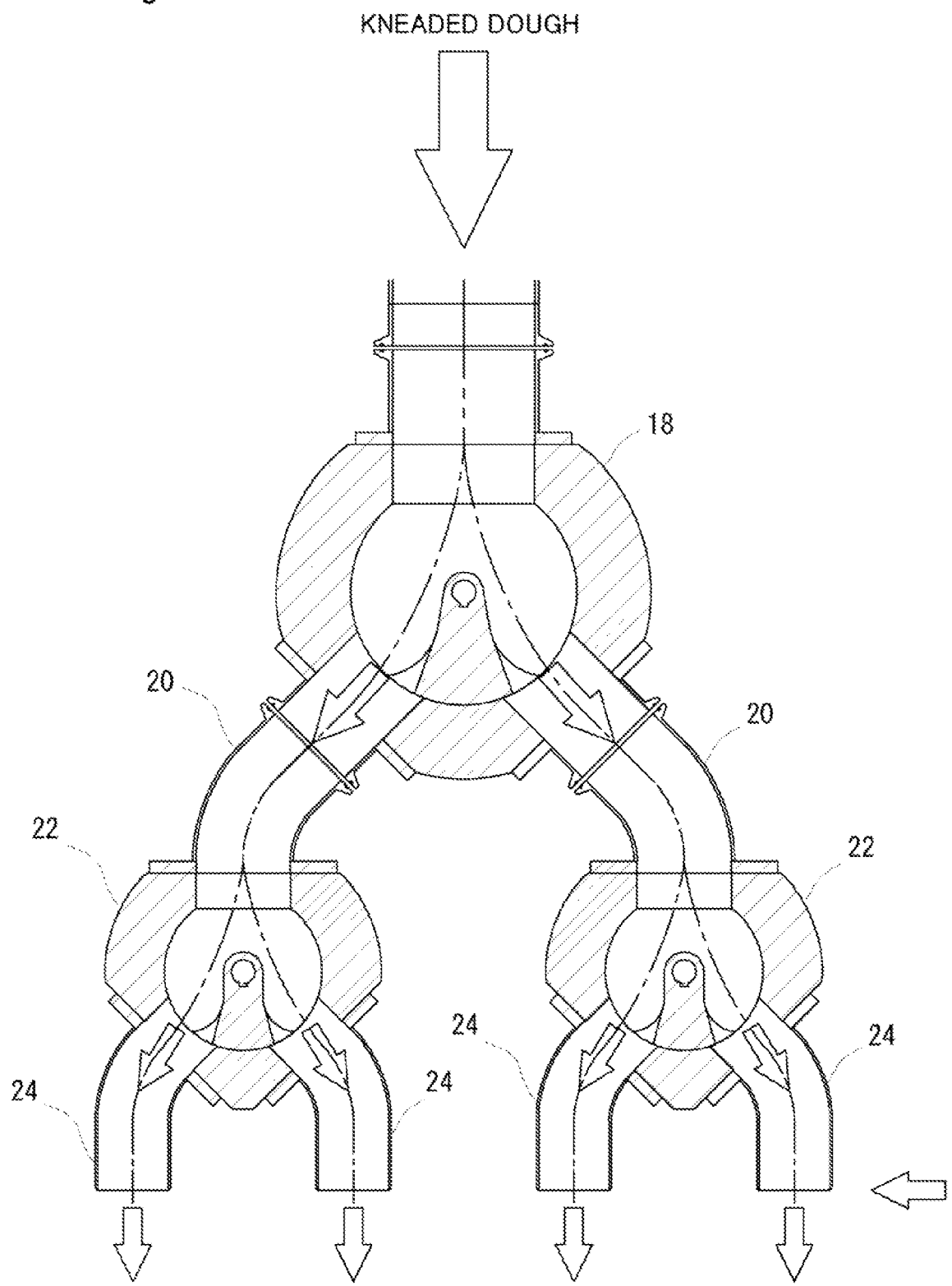
FIG. 2 is a sectional plan view of a dough distributing device shown at the right-hand side in FIG. 1.

As shown in FIG. 2, the dough distributing device 12 has a first dough distributor 18 that receives kneaded dough supplied from a mixer. The received dough is sent to two second dough distributors 22 through respective discharge pipes 20 and further delivered through dough discharge pipes 24 extending from each dough distributor 22, thereby forming a total of four streams of dough.

The dough dividing apparatus 16 has a dough discharge member 26 connected to the four dough discharge pipes 24 of the dough distributing device 12. The dough discharge member 26 has a front end surface 30 having a recessed surface 28 extending substantially horizontally and having a circular arc-shaped cross-section. The dough discharge member 26 further has dough discharge holes 34 connected to the dough discharge pipes 24, respectively, and having respective outlets 32 opening on the front end surface 30. Further, the dough dividing apparatus 16 has blade-shaped cutters 38 arranged forward of the front end surface 30 in a dough discharging direction and having respective cutting edges 36 extending in the longitudinal direction of the recessed surface 28 of the dough discharge member 26, and a cutter driving device 40 that rotationally drives the cutters 38 to cause the cutting edges 36 to periodically slide along the recessed surface 28 downward from above it, thereby cutting and dividing the dough continuously extruded from the outlets 32.

In the illustrated example, the dough discharge member 26 comprises four block-shaped members 26' connected to the dough discharge pipes 24, respectively, and connecting plates 26" that hold the four connecting plates 26' from the upper and lower sides to connect them into one unit. The four block-shaped members 26' each have the front end surface 30 having the recessed surface 28 and the dough discharge hole 34 having the outlet 32 opening on the front end surface 30 as stated above. The front end surfaces 30 of the four block-shaped members 26' are aligned with each other in the transverse direction of the dough dividing apparatus 16. The four block-shaped members 26' are provided with four cutters 38 corresponding to the dough discharge holes 34, respectively.

Figure 4:
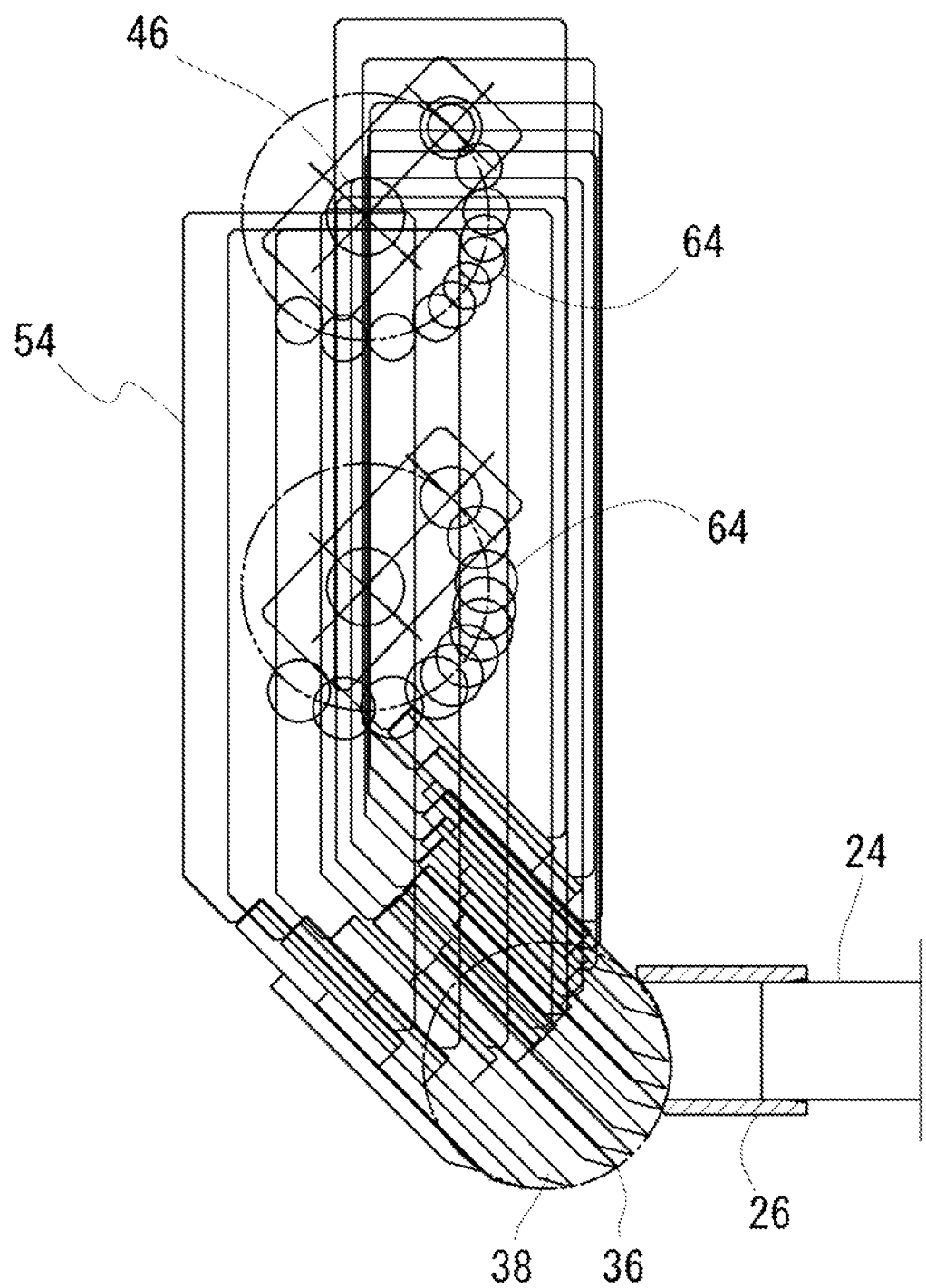
FIG. 4 is a diagram showing the path in which the cutter is moved by a parallel link mechanism of a driving device.

The cutter driving device 40 has a pair of parallel link mechanisms 44 spaced from each other in the width direction of the dough discharge member 26. That is, each parallel link mechanism 44 has a stationary frame (not shown) provided above the dough discharge member 26, a first rotating shaft 46 rotatably mounted on the stationary frame to extend parallel to the longitudinal direction of the recessed surface 28 of the dough discharge member 26, a second rotating shaft 48 rotatably mounted on the stationary frame in parallel to the first rotating shaft 46, mutually parallel first and second links 50 and 52 secured to the first and second rotating shafts 46 and 48 to rotate together with them, respectively, and a third link 54 provided between the first and second links 50 and 52 and rotatably attached to the distal ends of the first and second links 50 and 52 through pivot shafts 64. The first and second rotating shafts 46 and 48 are provided with first and second belt pulleys 56 and 58, respectively, over which a driving belt 60 passes to rotationally drive the first and second rotating shafts 46 and 48. The cutters 38 are secured to a support plate 66 secured between downward extending portions 62 of the third links 54. The cutters 38 are moved together with the third links 54 to make the cutting edges 36 perform circular motion (FIG. 4).

Figure 3:
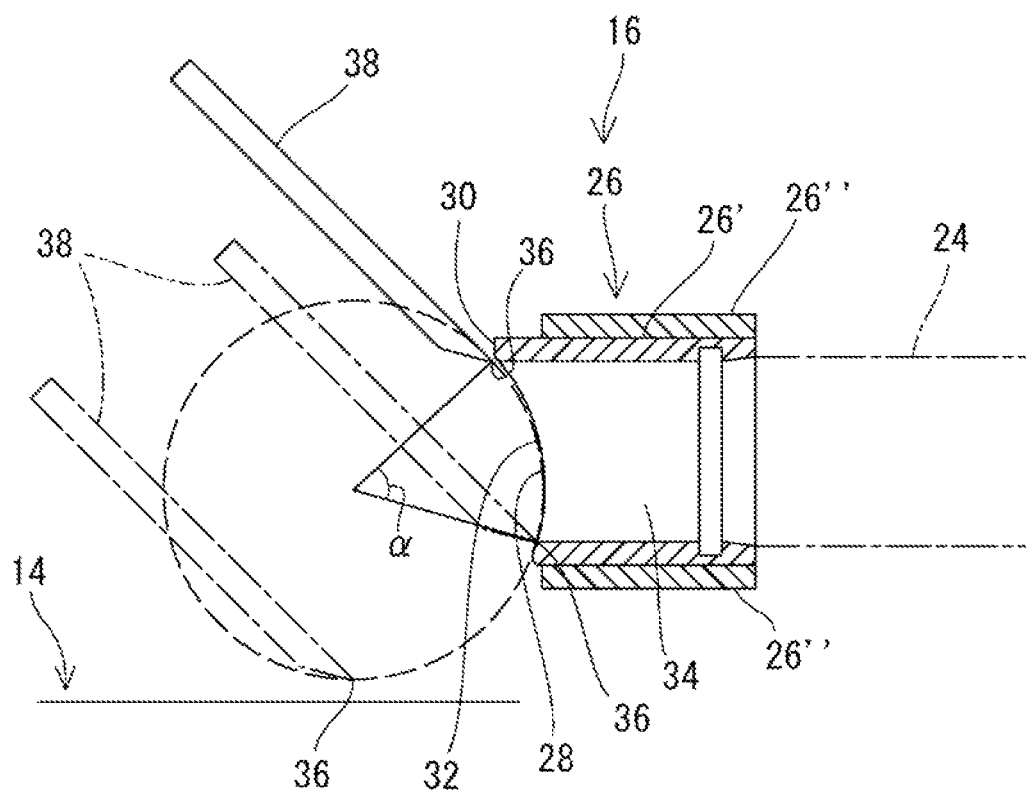
FIG. 3 is an explanatory view showing the operation of a cutter in the dough dividing apparatus shown in FIG. 1.

As shown in FIG. 3, the outlet 32 of each dough discharge hole 34 of the dough discharge member 26 has its lower end located rearward of its upper end. In the illustrated example, the cutting edge 36 of the cutter 38 slides along the surface of the outlet 32 over an angle range alpha of about 60 degrees in the 360-degree circular motion of the cutter 38. Thus, the angle range α is ⅙ of the circular motion.

The pieces of dough D divided by the dough dividing apparatus 16 are conveyed through a rounder (not shown) on the belt conveyor 14 before being sent to a proofer as an intermediate fermentation machine.

The invention claimed is:

1. A dough dividing apparatus comprising:
   a dough discharge member which includes a front end surface having an elongated recessed surface extending substantially horizontally and having a circular arc-shaped cross-section, the dough discharge member further including a dough discharge hole having an outlet opening on the front end surface;
   a blade-shaped cutter provided forward of and adjacent to the front end surface in a dough discharging direction, and having a cutting edge extending in a longitudinal direction of the recessed surface; and
   a cutter driving device that rotatably drives the blade-shaped cutter so as to cause the cutting edge to perform circular motion while keeping the blade-shaped cutter in a fixed posture so that the cutting edge periodically slides along the recessed surface downward from above the recessed surface to cut and divide dough continuously extruded from the outlet in the dough discharging direction.

2. The dough dividing apparatus of claim 1, wherein the cutter driving device has a parallel link mechanism that supports the cutter and that causes the cutting edge to perform circular motion.

3. The dough dividing apparatus of claim 2, wherein the parallel link mechanism has:
   a stationary frame provided above the dough discharge member;
   a first rotating shaft rotatably mounted on the stationary frame in parallel to the longitudinal direction of the recessed surface;
   a second rotating shaft rotatably mounted on the stationary frame in parallel to the first rotating shaft;
   mutually parallel first and second links secured to the first and second rotating shafts to rotate together with the first and second rotating shafts, respectively; and
   a third link provided between the first and second links and rotatably attached to distal ends of the first and second links,
   wherein at least one of the first and second rotating shafts are rotationally driven, and wherein the cutter is connected to the third link and moved together with the third link to cause the cutting edge to perform circular motion.

4. The dough dividing apparatus of claim 3, wherein the first and second rotating shafts have first and second belt pulleys, respectively, and are rotationally driven by a driving belt passing over the first and second belt pulleys.

5. The dough dividing apparatus of claim 1, wherein an upper end of the outlet is positioned farther in the dough discharging direction than a lower end of the outlet.

6. The dough dividing apparatus of claim 1, wherein the dough discharge member has a plurality of the dough discharge holes spaced from each other in the longitudinal direction of the recessed surface.

7. The dough dividing apparatus of claim 6, wherein the dough discharge member has a plurality of block-shaped members aligned with each other in the longitudinal direction of the recessed surface, the block-shaped members respectively having surfaces aligned with each other in the longitudinal direction of the recessed surface to constitute the front end surface, the dough discharge holes opening on the respective surfaces of the block-shaped members.

8. The dough dividing apparatus of claim 2, wherein an upper end of the outlet is positioned farther in the dough discharging direction than a lower end of the outlet.

9. The dough dividing apparatus of claim 3, wherein an upper end of the outlet is positioned farther in the dough discharging direction than a lower end of the outlet.

10. The dough dividing apparatus of claim 4, wherein an upper end of the outlet is positioned farther in the dough discharging direction than a lower end of the outlet.

11. The dough dividing apparatus of claim 1, wherein the arc of the arc-shaped cross-section of the front end surface forms a portion of a circular path along which the cutting edge moves in the circular motion.

\* \* \* \* \*